(12) United States Patent
Griffin et al.

(10) Patent No.: US 8,549,849 B2
(45) Date of Patent: Oct. 8, 2013

(54) INSULATED MAIN NH3 CARTRIDGE SYSTEM WITH SEPARATE START-UP UNIT

(75) Inventors: Gregory A. Griffin, Glendale Heights, IL (US); Timothy Yoon, Northbrook, IL (US); Jeffrey R. Kelso, Fort Wayne, IN (US); Adam C. Lack, Willow Springs, IL (US); Jason B. Arriaga, Fort Wayne, IN (US); Navtej Singh, Lombard, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 80 days.

(21) Appl. No.: 13/366,492

(22) Filed: Feb. 6, 2012

(65) Prior Publication Data

US 2012/0247089 A1   Oct. 4, 2012

Related U.S. Application Data

(60) Provisional application No. 61/469,344, filed on Mar. 30, 2011.

(51) Int. Cl.
*F01N 3/10* (2006.01)

(52) U.S. Cl.
USPC .................................. 60/303; 60/274; 60/286

(58) Field of Classification Search
USPC .. 60/274, 286, 303; 95/90–148; 96/108–154
See application file for complete search history.

(56) References Cited

U.S. PATENT DOCUMENTS

| 6,837,041 B2 * | 1/2005 | Hernier .......................... 60/286 |
| 7,740,816 B1 * | 6/2010 | St. Amant et al. ............. 423/210 |
| 2008/0260597 A1 * | 10/2008 | Suzuki et al. ................. 422/148 |
| 2010/0183493 A1 * | 7/2010 | Nochi et al. ............... 423/239.1 |

* cited by examiner

*Primary Examiner* — Thomas Denion
*Assistant Examiner* — Jason Shanske
(74) *Attorney, Agent, or Firm* — Mark C. Bach; Jeffrey P. Calfa

(57) ABSTRACT

A system and method relate to a reductant dosing for use in the reduction of NOx in an exhaust stream is disclosed. The system and method incorporates a separate first or start-up cartridge and an insulated mantel or housing containing at least one to a plurality of main cartridges. The first and main cartridges store an ammonia adsorbing/desorbing material, which releases ammonia gas upon application of sufficient heat. The start-up cartridge permits the initial release of ammonia gas into the exhaust stream even during start-up of an engine, and because it is separate from the main cartridge, the first cartridge cools faster than the main cartridge and can be replenished with ammonia sooner than the main cartridge. The start-up cartridge is housed in or surrounded by a non-insulating debris shield.

20 Claims, 2 Drawing Sheets

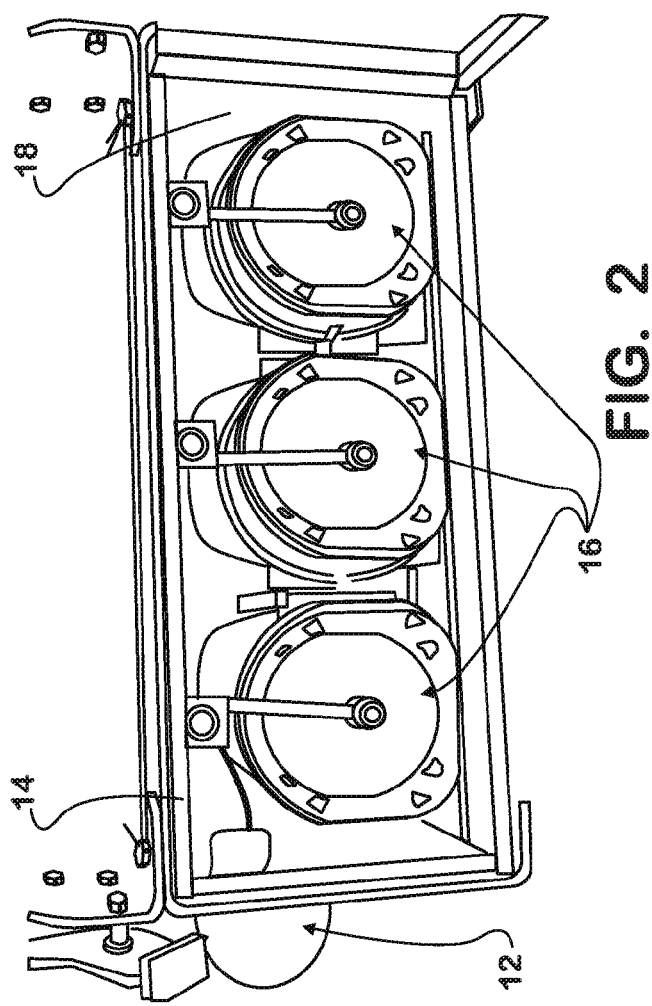
FIG. 2
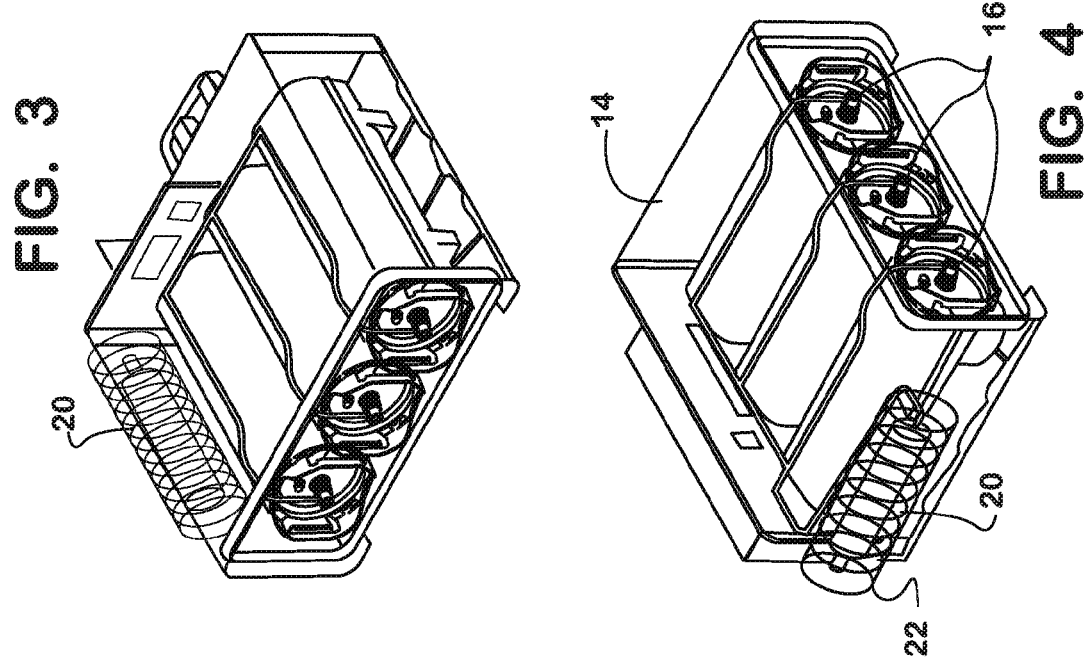
FIG. 3
FIG. 4

INSULATED MAIN NH3 CARTRIDGE SYSTEM WITH SEPARATE START-UP UNIT

TECHNICAL FIELD

The present system and method relate to the storage and delivery of a reductant or reducing agent, including ammonia. Particularly, the system and method relate to a reductant storage and delivery system incorporating a start-up cartridge separate and apart from an insulated mantel containing at least one to a plurality of main cartridges for use in the release of a reductant for use in reducing $NO_x$ in an exhaust stream.

BACKGROUND

Compression ignition engines provide advantages in fuel economy, but produce both $NO_x$ and particulates during normal operation. New and existing regulations continually challenge manufacturers to achieve good fuel economy and reduce the particulates and $NO_x$ emissions. Lean-burn engines achieve the fuel economy objective, but the high concentrations of oxygen in the exhaust of these engines yields significantly high concentrations of $NO_x$ as well. Accordingly, the use of $NO_x$ reducing exhaust treatment schemes is being employed in a growing number of systems.

One such system is the direct addition of ammonia gas to the exhaust stream. It is an advantage to deliver ammonia directly in the form of a gas, both for simplicity of the flow control system and for efficient mixing of reducing agent, ammonia, with the exhaust gas. The direct use of ammonia also eliminates potential difficulties related to blocking of the dosing system, which are cause by precipitation or impurities, e.g., in a liquid-based urea solution. In addition, an aqueous urea solution cannot be dosed at a low engine load since the temperature of the exhaust line would be too low for complete conversion of urea to ammonia (and $CO_2$).

Transporting ammonia as a pressurized liquid, however, can be hazardous if the container bursts caused by an accident or if a valve or tube breaks. In the case of using a solid storage medium, the safety issues are much less critical since a small amount of heat is required to release the ammonia and the equilibrium pressure at room temperature can be—if a proper solid material is chosen—well below 1 bar. An ammonia adsorbing/desorbing material can be provided in the form of disks or balls loaded into the cartridge or canister. The canisters are then loaded into a mantle or other storage device and secured to the vehicle for use. Appropriate heat is applied to the canisters, which then causes the ammonia-containing storage material to release its ammonia gas into the exhaust system of a vehicle, for example.

However, during engine start-up, there is generally insufficient heat to activate the ammonia storage material in the main canisters to the point of releasing its ammonia gas. Therefore, the present system and method incorporates a start-up cartridge, which can be quickly heated at start-up providing an initial release of ammonia gas into the exhaust stream, until the main cartridges are activated. In addition, because the start-up cartridge is positioned separate from the main cartridges, the start-up cartridge cools faster than the main cartridges, and can be recharged faster with ammonia gas than the main cartridges. Thus, the present system and method provides for quicker activation of the NO reduction cycle even at start-up. Additionally, the insulated mantle housing is an efficient thermal barrier maintaining required temperatures around the main ammonia-containing cartridges for continued ammonia gas release into the exhaust system.

SUMMARY

There is disclosed herein a system and method, each of which avoids the disadvantages of prior systems and methods while affording additional structural and operating advantages.

Generally speaking, the system and method relate to a reductant dosing system incorporating a first or start-up cartridge separate and apart from an insulated mantle housing containing a plurality of main cartridges. The start-up cartridge and main cartridges store an ammonia adsorbing/desorbing material until it is needed for the release of gaseous ammonia into the exhaust system of a vehicle.

In one embodiment, the system comprises a first cartridge, an insulated housing mantle, a plurality of main cartridges contained within the housing mantle, the main cartridges being fluidly connected to the first cartridge, a pre-determined amount of a reducing agent material stored within the first cartridge and each main cartridge, the material capable of releasing a reductant into the exhaust stream, wherein the first cartridge is positioned separate from the housing mantle and main cartridges within the system.

In another embodiment, the first or start-up cartridge includes a protective rock and debris shield.

A method for delivering ammonia gas to an exhaust stream of a vehicle for the reduction of $NO_x$, is disclosed. The method comprises the steps of providing a start-up cartridge containing an ammonia-containing material, providing an insulated mantle separate from the start-up cartridge, the mantle containing at least one main cartridge containing the ammonia-containing material, activating the start-up cartridge to release ammonia gas from the ammonia-containing material, directing a flow of ammonia gas from the start-up cartridge for delivery into the exhaust stream, utilizing a portion of the ammonia gas from the start-up cartridge for delivery into the exhaust stream, activating the main cartridge to release ammonia gas from the ammonia-containing material for delivery into the exhaust stream, cooling the start-up cartridge, and, recharging the first cartridge with ammonia gas.

In another embodiment, the step of cooling the start-up cartridge in the method further comprises positioning the start-up cartridge a distance away from the mantle and the main canisters, wherein the start-up cartridge cools prior to the main cartridge.

In yet another embodiment, the method further comprises the step of regulating an activating temperature inside the mantel, which includes maintaining a temperature within the mantle for sufficient release of ammonia gas from the ammonia-containing material within the main cartridge into the exhaust stream.

These and other embodiments and their advantages can be more readily understood from a review of the following detailed description and the corresponding appended drawings.

BRIEF DESCRIPTION OF THE DRAWINGS

FIG. 2 is a front view of the mantel housing containing the main cartridges and the start-up cartridge positioned on the outside of the housing;

FIG. 3 is a right side view of the mantle housing; and,

FIG. 4 is a left side view of the mantle housing and the start-up cartridge.

DETAILED DESCRIPTION

Figure 1:
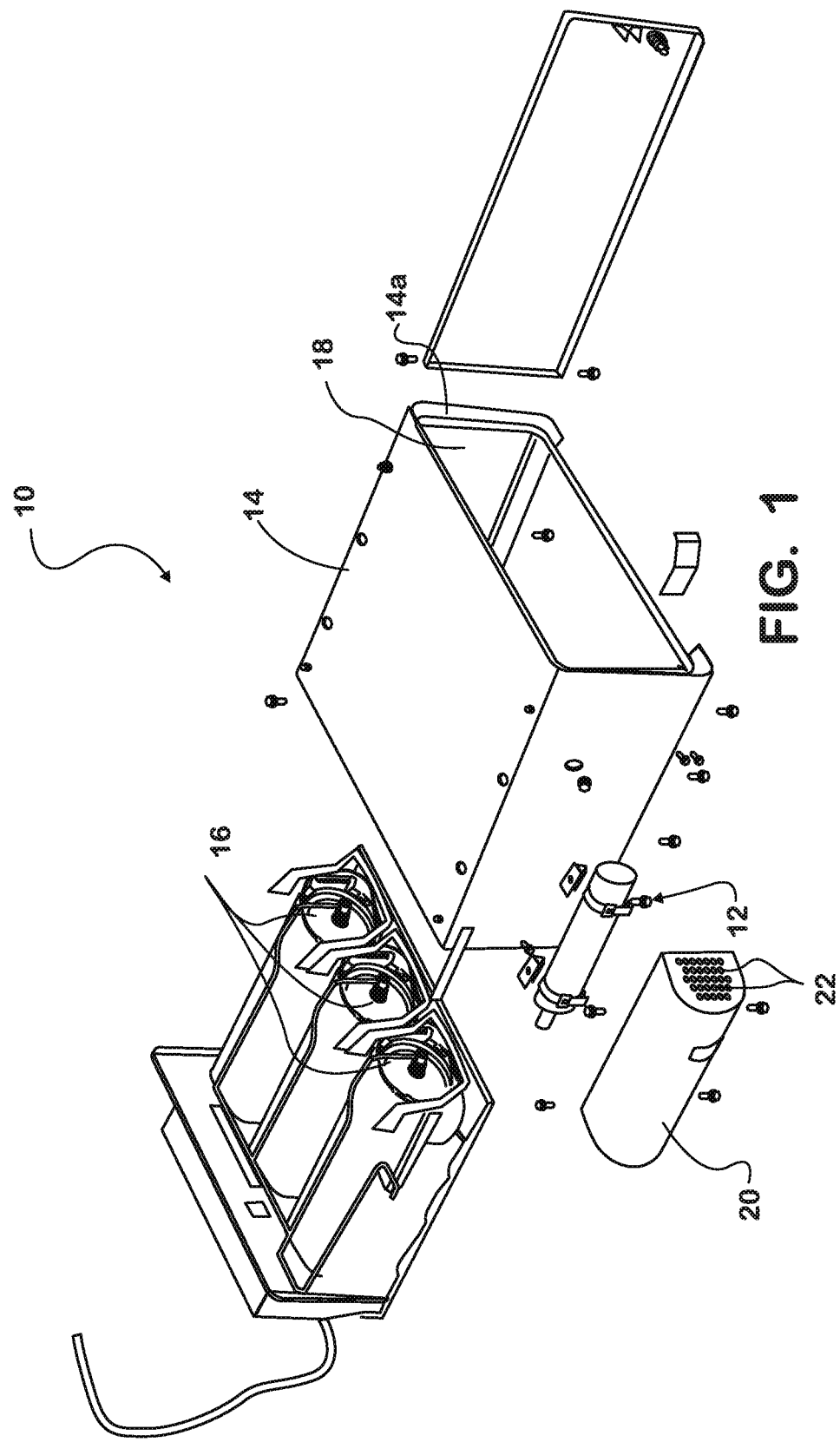
FIG. 1 is an exploded view of the present system incorporating the start-up cartridge and main cartridges within the mantle housing.

Referring to FIGS. 1-4, there is illustrated a system and method for storage of a reductant, such as ammonia, specifically in a solid form, and delivery of gaseous ammonia for use in the reduction of $NO_x$ in an exhaust stream (EGNR). Ammonia storage and dosing or delivery systems may be comprised of several components, including a start-up cartridge, at least one main cartridge, heating elements or jackets for the main cartridges, an ammonia control module (AFM), a peripheral interface module (PIM). The present system, generally designated by the numeral 10, is discussed with respect to ammonia storage and delivery, specifically for supplying ammonia gas through use of a start-up cartridge and a housing or mantle containing at least one main cartridge. The ammonia gas is used in the aftertreatment device (not shown) of a compression ignition engine (not shown). As the exhaust system of a vehicle, including that of a diesel engine, is well known, it will not be described in detail.

As shown in FIG. 2, the system 10 for use in ammonia dosing for the reduction of $NO_x$ in an exhaust stream includes a first or start-up cartridge 12 and a mantle housing 14 containing at least one main cartridge 16. The cartridges 12, 16, which may be referred to interchangeably as a container or a canister, typically have a cylindrical shape. The shape of the cartridges may vary depending on the user's requirements. The cartridges 12, 16 can be constructed from any suitable material that is sturdy for loading and transporting the reductant-containing material (not shown). In addition, the material for constructing the cartridges 12, 16 should ideally conduct heat, because the reductant-containing material used in the present system and method, requires heat to release the reductant, such as ammonia gas. Aluminum sheets are a suitable material for use in constructing the cartridges 12, 16 in a known manner. Aluminum has a low mass density and excellent thermal conductivity.

As shown in FIGS. 2-4, the main cartridge or cartridges 16 are enclosed within an insulated mantle or housing 14. The insulated housing 14 acts, not only to protect the cartridges from debris and such, but also to provide better temperature control within the mantle by minimizing the loss of heat to the ambient surroundings, as well as minimizing the effect of outside temperature changes on the cartridges. The housing 14 can be constructed from any suitable material, which is durable and lightweight, including steel, aluminum and plastic.

In order to accomplish the temperature control/regulating function within the housing 14, the housing may include an insulation layer 18 (FIG. 1). The insulation layer 18 is typically located on at least one interior wall 14a of the housing 14, and can be constructed from any suitable insulating material, such as foam. Controlling the temperature within the housing 14 by minimizing the temperature loss from within the housing, as well as minimizing the influence of outside ambient air temperature on the cartridges 16 results in more efficient and consistent release of ammonia gas from the ammonia-containing material within the cartridge to an aftertreatment device 30.

As mentioned, heat is required to release or desorb ammonia gas from the ammonia-containing material within the cartridges for use in the reduction of $NO_x$ in the exhaust stream. However, on initial engine start-up, operating temperatures are not yet at the level to activate the release of ammonia gas from the main cartridges. Therefore, the present system 10 incorporates a first or start-up cartridge 12. As shown in FIG. 1, the start-up cartridge 12 is significantly smaller than the main cartridge 16, typically, about one-half to one-third the size of the main cartridge 16. Because of its smaller size, the start-up cartridge 12 can heat more quickly than the main cartridges 16, reaching the required temperature to release ammonia gas from the start-up cartridge and initiate the $NO_x$ reduction process. The start-up cartridge 12 is especially useful during the start-up phase of the engine when the operating temperatures are still low, and the temperature has not reached a level to initiate release of ammonia gas from the main cartridges 16. In addition, the smaller size of the start-up cartridge 12 permits it to cool faster than the main cartridges 16, leading to faster re-charging of the ammonia adsorbing/desorbing material within the start-up cartridge with ammonia gas.

As shown in FIGS. 1, 3 and 4, because the first or start-up cartridge 12 is not positioned within the housing 14, the start-up cartridge 12 also includes a protective shield or cover 20. The shield 20 is a cage-like structure that surrounds the first cartridge 12 protecting it from damage that may be caused from rocks and other debris encountered on the road. The shield 20 includes a plurality of openings or holes 22, either on the opposing ends of the shield or arranged randomly around the entire surface of the shield (FIG. 4). Thus, the shield does not function as an insulating structure. Rather, the plurality of openings or holes 22 permit sufficient air flow around the start-up cartridge 12 to quickly cool the start-up cartridge for recharging, as discussed below.

Both the start-up cartridge 12, and the main cartridges 16 are loaded with a reductant, such as an ammonia adsorbing/desorbing material. The ammonia-containing material can be in the form of a compressed powder or granules, or contained within tins for ease of packing into the cartridges. The material may be formed using existing powder metal press technology. Regardless of the technology used to prepare the material, it is important to prevent the dissipation of ammonia during the formation of the material. Suitable material for use in the present system 10 include metal-ammine salts, which offer a solid storage medium for ammonia, and represent a safe, practical and compact option for storage and transportation of ammonia. Ammonia may be released or desorbed from the metal ammine salt by heating the salt to temperatures in the range from 10° C. to the melting point to the metal ammine salt complex, for example, to a temperature from 30° to 700° C., and preferably to a temperature of from 100° to 500° C. Generally speaking, metal ammine salts useful in the present device include the general formula $M(NH_3)_nX_z$, where M is one or more metal ions capable of binding ammonia, such as Li, Mg, Ca, Sr, V, Cr, Mn, Fe, Co, Ni, Cu, Zn, etc., n is the coordination number usually 2-12, and X is one or more anions, depending on the valence of M, where representative examples of X are F, Cl, Br, I, $SO_4$, $MoO_4$, $PO_4$, etc. Preferably, ammonia saturated strontium chloride, $Sr(NH_3)Cl_2$, is used. While embodiments using ammonia as the preferred reductant are disclosed, the invention is not limited to such embodiments, and other reductants may be utilized instead of, or in addition to, ammonia for carrying out the inventions disclosed and claimed herein. Examples of such other, or additional reductants include, but are not limited to, urea, ammonium carbamate, and hydrogen.

Applying sufficient heat to the main cartridges 16 may be accomplished through use of any suitable heating device, such as heating jacket or mantle (not shown) surrounding each one of the cartridges. Heating the start-up cartridge 12 can be accomplished through incorporation of electrical heating wires or elements within or surrounding the cartridge. During the initial start-up of an engine, there is generally insufficient heat generated to activate the ammonia-containing material, especially material stored in the main canisters 16 within the mantle housing 14. Therefore, in order to jump-start the release of ammonia gas into the aftertreatment device and the exhaust stream, the smaller first or start-up cartridge 12 is positioned separately from the mantle 14 containing the main cartridges 16. Because of its significantly smaller size than that of the main cartridges 16, the start-up cartridge 12, which includes its own heating element (not shown) can be heated quickly after receiving the appropriate signals from the vehicle's electronics system (not shown). In this manner, the start-up cartridge 12 can begin releasing reductant or ammonia gas into an aftertreatment device (not shown) for treatment of $NO_x$ in the exhaust stream practically from the initial start-up of the engine. The flow of ammonia gas from the start-up cartridge 12 and the main cartridges 16 is directed through an ammonia flow module (not shown), which contains a plurality of circuits and sensors (the operation of which is known and will not be described here in detail), which are designed to direct sufficient flow of ammonia gas to the aftertreatment device and exhaust stream.

Once the ammonia gas is released to a certain level from the ammonia-containing material contained within the first cartridge 12, and the system temperature has reached a sufficient level to activate the main cartridge 16, the first cartridge 12 can be cooled and replenished with ammonia for subsequent use. Positioning the start-up cartridge 12 outside of the mantle 14 containing the main cartridges 16 prevents it from being affected by the heat generated from the mantle 14 and main cartridges 16, which permits much faster cooling of the start-up cartridge 12. Once the cartridge 12 cools to a certain level where the ammonia gas is no longer released from the ammonia-containing material, the material within the cartridge can be replenished or recharged with ammonia gas. Replenishing the ammonia-containing material can be accomplished in any number of ways, including re-directing the flow of ammonia gas released from the main cartridges 16 due to the drop in temperature of the start-up cartridge to the start-up cartridge, or replenishing by an outside, exterior source of ammonia gas, such as at a service station, or by any other suitable means.

The present method is useful for dosing a reductant, such as ammonia into the exhaust stream of a vehicle for the catalytic reduction of NO from the initial start-up of the vehicle and during normal running operation at any level. The method is accomplished through the use of the first or start-up cartridge 12 that is small enough to heat immediately upon start-up of the vehicle. The first cartridge 12 then releases ammonia gas into the exhaust stream to a certain level and/or until the main cartridge unit or units 16 is at a sufficient temperature to start the flow of ammonia gas into the aftertreatment device and exhaust stream. In addition, by positioning the start-up cartridge 12 outside of the insulated mantle housing 14 containing the main cartridge units 16, the start-up cartridge is able to cool down quickly without being influenced by any heat generated from the main cartridges. Thus, the ammonia-containing material in the start-up cartridge 12 can be replenished quickly once the cartridge is cooled below the temperature required for the release of ammonia gas. Independently positioning the start-up cartridge from the main cartridges enables a continuous NOx treatment cycle, from engine start-up to cool down.

The method further comprises a step of maintaining an activation temperature inside the mantle 14 for release of ammonia gas from the ammonia-containing material within the main cartridges. In this manner, the method provides for a consistent flow of ammonia into the exhaust stream, and thus, a more efficient and consistent reduction of $NO_x$.

What is claimed is:

1. A reductant dosing system for reducing $NO_x$ in an exhaust stream, the system comprising:
    a first cartridge;
    an insulated housing mantle;
    a plurality of main cartridges contained within the housing mantle, the main cartridges being fluidly connected to one another and the first cartridge;
    a pre-determined amount of a reductant material stored within the first cartridge and each main cartridge, the material capable of releasing a reductant gas into the exhaust stream; and,
    wherein the first cartridge is positioned a distance separate from the housing mantle and main cartridges within the system.

2. The system of claim 1, wherein the first cartridge is positioned outside the insulated housing.

3. The system of claim 2, wherein the first cartridge is attached to an outside surface of the housing.

4. The system of claim 1, wherein the first cartridge includes a protective shield.

5. The system of claim 3, wherein the protective shield includes a plurality of openings.

6. The system of claim 4, wherein the shield is non-insulating.

7. The system of claim 1, wherein the reductant material is an ammonia adsorbing/desorbing material.

8. The system of claim 7, wherein the system further includes an ammonia flow module operably connected to and regulating the flow of ammonia gas from the ammonia adsorbing/desorbing material stored within the first cartridge and the main cartridges in the exhaust stream.

9. An ammonia dosing system for the reduction of $NO_x$ in an exhaust stream, the system comprising:
    a closed housing positioned separate from the start-up cartridge in the system;
    a plurality of main cartridges contained within the housing mantle, the main cartridges containing pre-determined amount of an ammonia adsorbing/desorbing material;
    a start-up cartridge having a cover, the start-up cartridge containing a pre-determined amount of the ammonia adsorbing/desorbing material, the start-up cartridge being positioned separate from the housing; and,
    wherein the start-up cartridge is heated at start-up of an engine for initial release of ammonia gas from the ammonia adsorbing/desorbing material stored therein and prior to the heating activation of the main cartridges within the closed housing, and wherein the start-up cartridge is cooled and replenished with ammonia gas prior to the main cartridges.

10. The system of claim 9, wherein the housing includes at least one insulation layer.

11. The system of claim 9, wherein the start-up cartridge cover includes a plurality of openings.

12. The system of claim 11, wherein the start-up cartridge cover is non-insulating.

13. A method for delivering ammonia gas to an exhaust stream of a vehicle for the reduction of $NO_x$, the method comprising the steps of:
    providing an insulated mantle containing at least one main cartridge storing an ammonia-containing material;

providing a start-up cartridge outside of the mantle, the start-up cartridge storing an ammonia-containing material;

activating the start-up cartridge to release ammonia gas from the ammonia-containing material;

directing a flow of ammonia gas from the ammonia-containing material in the start-up cartridge for delivery into the exhaust stream;

utilizing a portion of the ammonia gas released from the start-up cartridge in reducing $NO_x$ in the exhaust stream;

activating the main cartridge to release ammonia gas from the ammonia-containing material for delivery into the exhaust stream;

cooling the start-up cartridge; and, recharging the start-up cartridge with ammonia gas.

14. The method of claim 13, wherein the method further includes recharging the main cartridge with ammonia gas after recharging the start-up cartridge.

15. The method of claim 13, wherein the step of activating the start-up cartridge comprises heating the cartridge at a start-up period of the vehicle.

16. The method of claim 13, wherein the step of directing a flow of ammonia gas from the start-up cartridge into the exhaust stream includes passing the flow through an ammonia flow module then to an aftertreatment device.

17. The method of claim 13, wherein the method further comprises the step of regulating an activating temperature inside the mantle.

18. The method of claim 13, wherein the step of regulating the activating temperature includes maintaining a temperature within the insulated mantle for release of ammonia gas from the ammonia-containing material within the main cartridge.

19. The method of claim 13, wherein the step of cooling the start-up cartridge further comprises positioning the start-up cartridge separate from the mantle, wherein the start-up cartridge cools prior to the main cartridge.

20. The method of claim 13, wherein the step of recharging the start-up cartridge comprises recirculating ammonia gas from the main cartridge into the start-up cartridge.

* * * * *